(12) United States Patent
Alolabi

(10) Patent No.: US 6,980,965 B2
(45) Date of Patent: Dec. 27, 2005

(54) FLORIST REGISTRY

(76) Inventor: Zackery Alolabi, 710 Briar Hill, Houston, TX (US) 77042

( * ) Notice: Subject to any disclaimer, the term of this patent is extended or adjusted under 35 U.S.C. 154(b) by 516 days.

(21) Appl. No.: 09/784,692

(22) Filed: Feb. 15, 2001

(65) Prior Publication Data

US 2002/0111875 A1 Aug. 15, 2002

(51) Int. Cl.$^7$ .............................................. G06F 17/60
(52) U.S. Cl. ........................................ 705/26; 705/27
(58) Field of Search ................................... 705/26–27

(56) References Cited

U.S. PATENT DOCUMENTS

| | | | |
|---|---|---|---|
| 5,774,874 A | | 6/1998 | Veeneman et al. ............. 705/27 |
| 5,809,479 A | * | 9/1998 | Martin et al. .................. 705/11 |
| 6,055,519 A | * | 4/2000 | Kennedy et al. ............... 705/80 |
| 6,430,540 B1 | * | 8/2002 | Guidice et al. ................ 705/28 |
| 6,591,243 B1 | * | 7/2003 | Grettve et al. .................. 705/8 |
| 6,609,106 B1 | * | 8/2003 | Robertson ..................... 705/26 |
| 2002/0069124 A1 | * | 6/2002 | Hayes et al. .................. 705/26 |

OTHER PUBLICATIONS

DM News, "Martha by Mail Unveils Online Flower Service (Catalog Arm of Martha Stewart Living Omnimedia, Martha by Mail, Launches marthasflowers.com Fresh Floral Delivery Service)," v22n4p6, Dialog file #9 #2719826.*

* cited by examiner

Primary Examiner—Robert M. Pond
(74) Attorney, Agent, or Firm—Hugh R. Kress; Browning Bushman P.C.

(57) ABSTRACT

A coordinated system is provided whereby a subscriber or registrant may register with a specific merchant or a service which ties a plurality of merchants together. Preferences with the merchant or system are expressed and recorded in the system. Then, as items filling those preferences are purchased, a record is maintained of such purchases, and the orders are filled over a preselected period of time.

9 Claims, 2 Drawing Sheets

FLORIST REGISTRY

FIELD OF THE INVENTION

The present invention relates generally to the field of computerized gift registries and, more particularly, to a registry system for the use of florists and similar merchants providing a capability of filling gift orders over time.

BACKGROUND OF THE INVENTION

A bride-to-be often registers at various merchants to express her preferences in certain items she would like to receive as gifts for her wedding. For example, she may register with a merchant who specializes in dinner ware and the like, and selects a particular style and pattern of dinnerware, and also selects specific items in that style and pattern. The merchant keeps track as items are purchased for the registered bride, preferably on a computer system, so that only a predetermined number of each item selected by the bride is purchased. Often, the bride registers at more than one merchant, and the merchants typically tie their tracking system together for the convenience of the bride and the purchasers so that the same item is not purchased at two different stores. Or one particular merchant may have more than one location, and the purchase of an item at one location is reflected in the records of all locations.

Then, wedding guests wishing to buy a gift for the bride find out where the bride is registered and go to that merchant to select a gift for the bride. As each item is purchased, the purchase is noted and that way the bride receives no more than what she has selected.

Such a system would be very helpful in other situations as well. For example, when someone is hospitalized, then his or her family can register with a florist or other gift merchant, expressing particular preferences in what the patient would appreciate receiving. Such a system could then be helpful in other ways. For example, if a patient is registered with a florist, or with a service which ties a plurality of such merchants together, then the flowers or other gifts could be delivered over a period of time, and not all on the same day.

The present invention addresses this need in the art.

SUMMARY OF THE INVENTION

The present invention provides a coordinated system whereby a subscriber or registrant may register with a specific merchant or a service which ties a plurality of merchants together. Preferences with the merchant or system are expressed and recorded in the system. Then, as items filling those preferences are purchased, a record is maintained of such purchases, and the orders are filled over a preselected period of time or at some specified later date. Also, the system is capable of recalling that a purchase has been made and filled, but provides the capability of restoring that item to the registry if desired.

Such a system is particularly adapted to a florist system and the like. In order to avoid a large quantity of goods such as flowers being delivered all at one time, the system maintains a timing record whereby ordered goods are delivered over a predetermined period of time. Cut flowers and the like are particularly perishable, so the timed delivery of the perishable goods ensures that fresh flowers are available over a longer period of time. For example, many people enjoy giving flowers to newlyweds, and the system provides the capability of delivering some flowers to the newlyweds before their honeymoon and some to them after they return.

The system is also adapted to other situations where the timing of the delivery of perishable goods is important. For example, when a woman is expecting a baby, she is often given a baby shower. The system of this invention can be particularly useful in avoiding the duplication of gifts for the expectant mother, and for the delivery of merchandise over a specified time before and after the baby arrives. The system can also be expanded to specify specific baby items after the delivery, but is particularly well adapted to deliver flowers and other perishable goods so that they are not all provided at the same time.

Further, anniversaries are often times of celebration, with the delivery of flowers. This system provides the capability of delivering appropriate goods specified for a particular anniversary, such as wood, or paper, or silver, or gold over a period of time. Or, if a husband remembers in December of an anniversary in March, he can register with the system of the present invention with confidence that his gift to his wife will be timely delivered.

These and other features of the present invention will be apparent to those skilled in the art from a review of the following detailed description.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

DETAILED DESCRIPTION OF PREFERRED EMBODIMENTS

Figure 1:
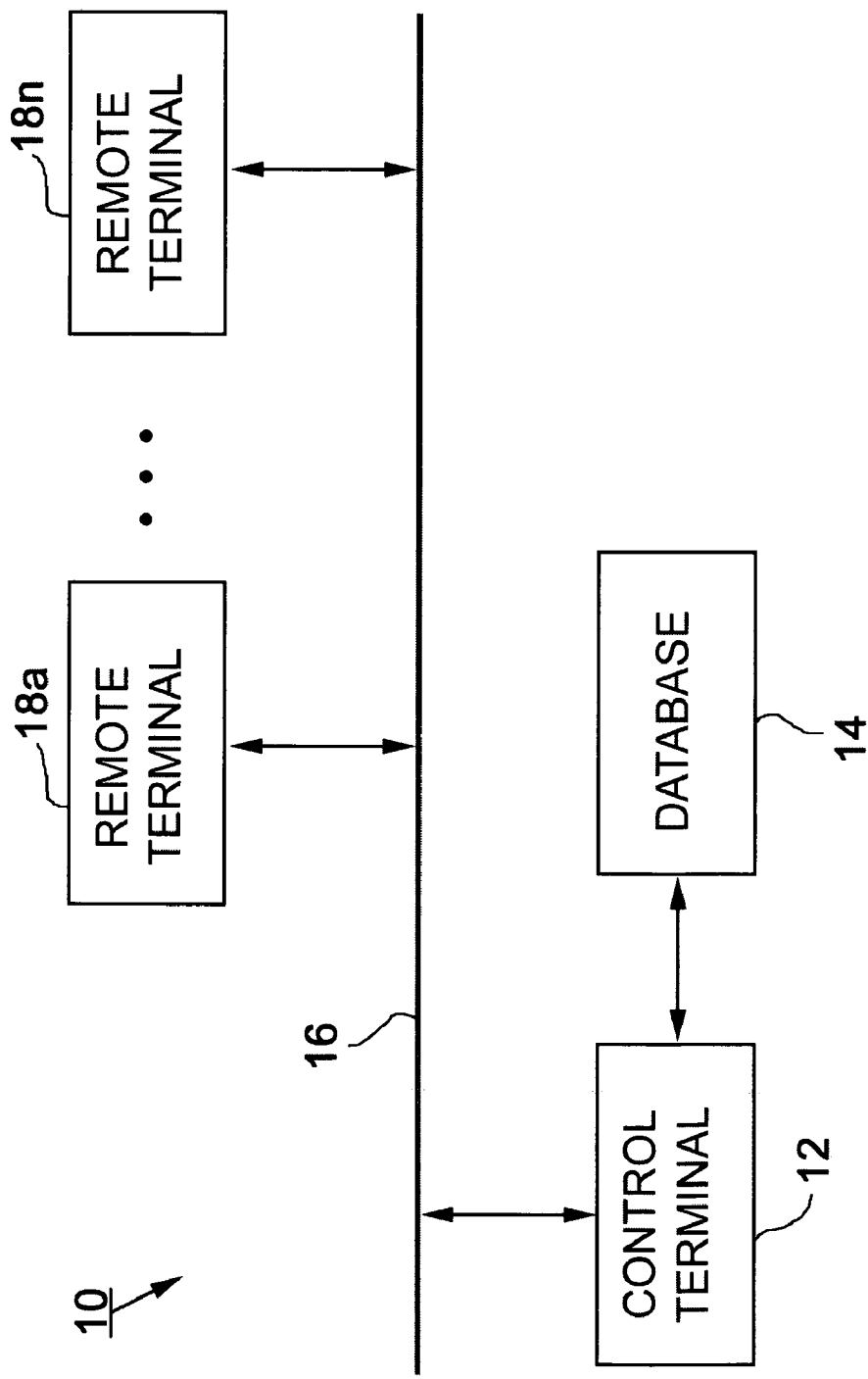
FIG. 1 is a schematic diagram of a coordinated system of the present invention in which a number of terminals are tied together.

FIG. 1 depicts a basic schematic diagram wherein the present invention may find application. The diagram illustrates the presently preferred embodiment, but it should be understood that the present invention is equally applicable to a single site having a single computer system.

A preferred coordinated system 10 includes a central control terminal 12 which communicates directly with a data base 14. The terminal 12 is programmed with the logic illustrated in FIG. 2. The data base 14 preferably includes data regarding the preferences of prospective recipients of goods, such as types of flowers, colors, religion, non-profit organizations which may be the benefactors of monetary gifts, and other preferences.

The terminal 12 is preferably coupled to a global communications network 16, such as the Internet. One or more remote terminals 18a through 18n are also coupled to the network 16 for communicating with the terminal 12.

The computer, referred to as terminal 12, may be physically located at a merchant's place of business, or it may be located at a service provider. In either case, security is provided to the data in the data base 14 so that the information provided is only accessible to the user of the control terminal. Data may be entered via the control terminal 12 either at the terminal 12 or through the network 16. A prospective registrant logs in and is permitted to enter data regarding the preferences for goods, such as for example flowers, arrangements, gifts, and the like. Then, another registrant may log in and express the same or different preferences, which may also include a price range, religious preferences, or other distinctive features of the flowers or gifts that the registrant prefers. Other purchasers registrants may also log into the system and similarly order goods.

The control terminal then schedules the delivery or filling of the orders by the various registrants over a period of time. That way, the requested goods, particularly perishable goods such as cut flowers, are not all delivered at the same time. The control terminal communicates with the data base 14, which is preferably maintained in a structured query language (SQL) for ease of cross reference to the various characteristics of the goods available and the goods ordered. The control terminal 14 also includes an inventory control program with access to the same SQL data base 14 to ensure that advertised goods are timely available.

Figure 2:
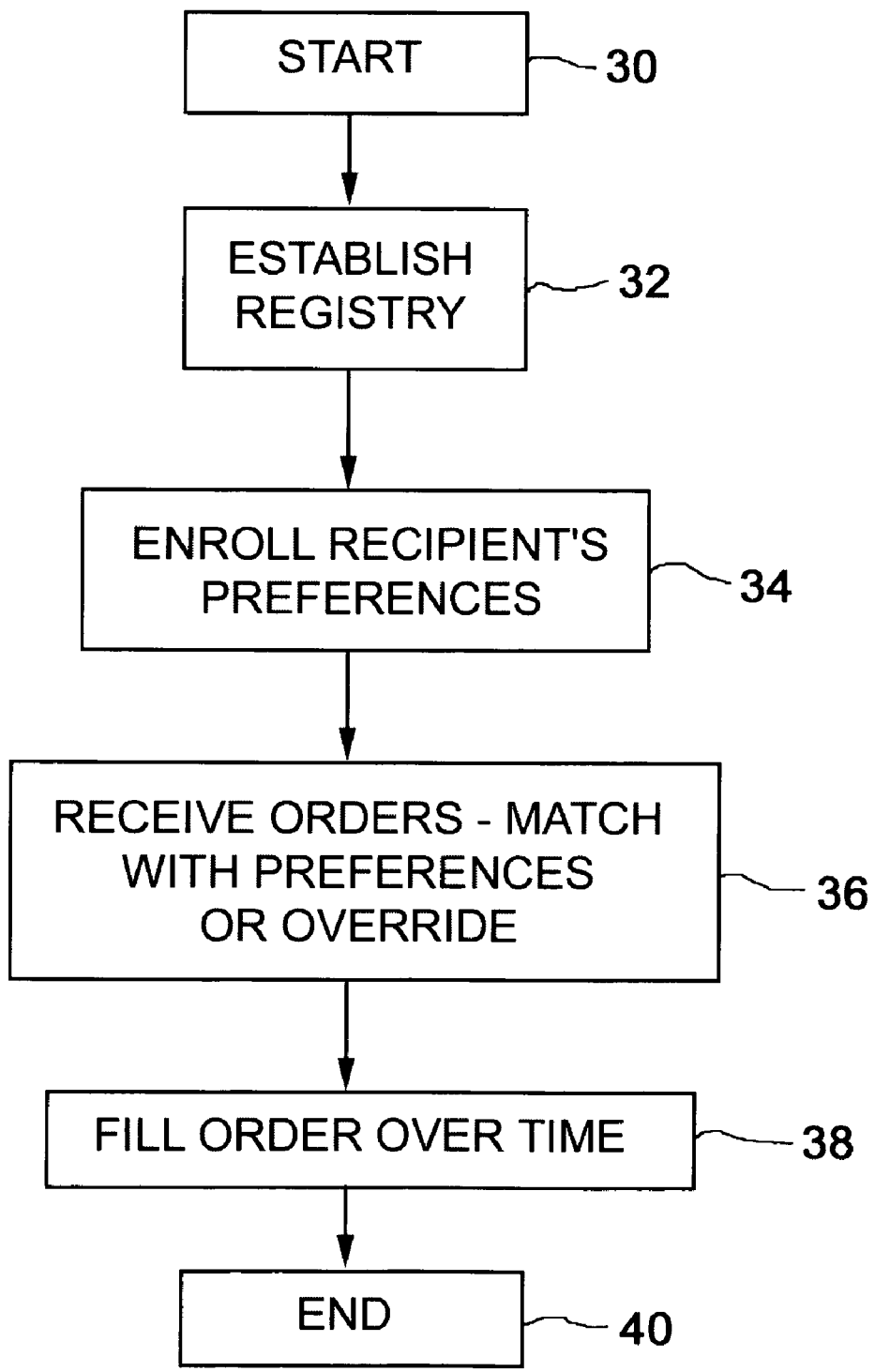
FIG. 2 is a logic flow diagram illustrating the basic features of the operation of the system.

FIG. 2 illustrates a preferred logic for the program in the terminal 14. The method illustrated in FIG. 2 begins with a start routine 30 which loads up a registry in step 32. The registry preferably includes the preferences of the prospective recipient of the goods, but the registry may also be initiated by a single purchase from a registrant. Thus, the preferences may be specified by the prospective recipient or by registrants to the system. Once the registry is established, the prospective recipients may enroll their preferences into the system as previously described and as represented by step 34 in FIG. 2. The preferences are also preferably editable.

When the merchant, having control over the terminal 12, receives orders from registrants (step 36 in FIG. 2), a match is attempted with the preferences already established by the prospective recipient. The registrant is also provided with the option of ordering goods which are not within the preferences expressed by the recipient. The system then schedules the filling of the order or orders (step 38 in FIG. 2), and if more than one order is placed, the default setting for the system schedules delivery or filling of the orders at different times, i.e. over a time period. Once all orders have been filled, the transaction ends (step 40 in FIG. 2).

This invention is equally applicable to environments other than florists. For example, needy people may call into a church or ministerial organization, requesting assistance. The system registers the prospective recipient, and records preferences, such as baby formula for an infant, clothing sizes for children and adults, and other preferences. Then, the system will schedule the filling of the preferences over time, such as perishable food items and the like. Other scenarios are equally applicable.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A perishable goods gift registry system comprising:
    a. a control computer in communication with a gift registry computer database, said gift registry computer database recording preferences of registrants as prospective recipients of perishable goods orders;
    b. remote terminals in communication with said control computer for recording in said gift registry computer database at least two perishable goods gift orders for a prospective recipient from one or more purchasers who are not said prospective recipient;
    c. wherein said preferences designated by said prospective recipient or on behalf of said prospective recipient include a preselected period of time during which said prospective recipient prefers to have said at least two perishable goods orders delivered;
    and wherein said control computer maintains a record for controlling delivery of said at least two perishable goods gift orders from said one or more purchasers who are not said prospective recipient to said prospective recipient on at least two different days in said preselected period of time.

2. The system of claim 1, wherein said orders from said one or more purchasers who are not said prospective recipient are matched by said control computer with said preferences of said prospective recipient.

3. The system of claim 1, wherein orders from said one or more purchasers who are not said prospective recipient are received over a global communications network.

4. The system of claim 1, wherein said gift registry computer database for recording said preferences of said prospective recipient comprises a common database in a structured query language.

5. A method of filling perishable goods gift orders by a gift registry system comprising the steps of:
    a. establishing in a control computer in communication with a gift registry computer database a gift registry of registrants as prospective recipients;
    b. enrolling in said gift registry computer database preferences of said prospective recipients, wherein said preferences designated by a prospective recipient or on behalf of said prospective recipient include
        (i) at least one perishable goods gift preference; and
        (ii) a preselected period of time during which said prospective recipient prefers to have at least two perishable goods gift orders delivered;
    c. receiving at said control computer said at least two perishable goods gift orders from one or more purchasers who are not said prospective recipient to be provided to said prospective recipient for which said at least two perishable goods gift orders were received;
    d. matching in said control computer said at least two perishable goods gift orders from said one or more purchasers who are not said prospective recipient with said preferences of said prospective recipient for which said at least two perishable goods gift orders were received; and
    e. scheduling by said control computer for said at least two perishable goods gift orders received from said one or more purchasers who are not said prospective recipient to be delivered to said prospective recipient during said preselected period of time designated by said prospective recipient, wherein one of said at least two perishable goods gift orders is to be delivered on a first day in said preselected period of time and another of said at least two perishable goods gift order is to be delivered on a different day in said preselected period of time.

6. The method of claim 5, wherein said preferences of said prospective recipient are specified by someone other than said prospective recipient.

7. The method of claim 5, wherein the perishable goods are flowers.

8. The method of claim 5, wherein the step of enrolling said preferences of said prospective recipient into said gift registry computer database is performed over a global communications network.

9. The method of claim 5, wherein the step of receiving orders for the perishable goods is performed over a global communications network.

* * * * *